2,998,377
PROCESS FOR DECOLORIZING PETROLEUM CERESIN

Harold Beuther, Penn Hills, Alfred M. Henke, Springdale, and William C. Offutt, Pittsburgh, Pa., assignors to Gulf Research & Development Company, Pittsburgh, Pa., a corporation of Delaware
No Drawing. Filed Aug. 4, 1958, Ser. No. 753,076
4 Claims. (Cl. 208—27)

This invention relates to a process for the improvement of petroleum ceresins. More particularly this invention relates to the hydrogenative treatment of petroleum ceresins having varying degrees of discoloration to produce a substantially color free product.

Petroleum ceresins are normally refined by filtering through an adsorbent which serves to remove some of the color forming constituents. A yellow petroleum jelly is usually produced. If a white or premium quality jelly is desired, more drastic refining methods are resorted to such as treatment with sulfuric acid to remove the remainder of the color forming constituents followed by caustic treating and then a possible clay contact.

In accordance with this invention, colored petroleum ceresins are decolorized to form premium quality water white to milky white materials by passing the colored petroleum ceresin material in the presence of hydrogen over a sulfur containing catalyst comprising at least one metal selected from group VI-B and group VIII of the periodic table under saturative hydrogenation and non-cracking conditions of temperature and pressure. For example, petroleum ceresins which are discolored, generally with brownish and yellowish hues, are saturatively hydrogenated to produce water white to milky white products. No appreciable loss of material is experienced in the decolorizing process of this invention in contrast to the substantial losses obtained when decolorizing by employing an adsorbent clay and sulfuric acid treatment.

We have found that the presence of any unsaturation, whether it is in the form of olefin unsaturation or aromatic unsaturation, contributes to the discoloration of a petrolatum material. Accordingly, for the complete removal of coloration, it is necessary that substantially all unsaturation present be removed during the hydrogenation process. Since it is relatively more easy to remove olefinic unsaturation than it is to saturate aromatics to naphthenes, the hydrogenation process of this invention will remove substantially all the olefinic saturation before the removal of a high degree of aromatic unsaturation. In the practice of this invention, therefore, substantially all of the olefins will be converted to saturated paraffins before a high degree of conversion of aromatics to naphthenes is achieved. In order to achieve a high degree of color removal in accordance with this invention not only should there be a substantially complete saturation of all olefins and diolefinic constituents, but furthermore at least 60 percent of the aromatics should be saturated to the corresponding naphthenes, preferably 75 percent of the aromatics present should be saturated to the corresponding naphthenes and most preferably 90 percent of the aromatics present should be saturated to the corresponding naphthenes.

The occurrence of any cracking concurrent with the desired hydrogenation process results in either a loss of yield or an impairment of the consistency and quality of the product. Accordingly, the saturation process must occur by employing catalysts and conditions which provide the necessarily high hydrogenation activity while substantially avoiding any hydrocracking. In order to avoid any substantial loss of yield in accordance with this invention the amount of hydrocracking should not be above 10 percent and should preferably be below 5 percent. Most preferably, substantially no hydrocracking should occur. If hydrocracking does not exceed these limits the yellow to brown color characteristics of the charge can be altered to water white to milky white without appreciable loss of yield or impairment of consistency or quality of the product.

Since the presence of aromatics as well as olefins imparts a coloring effect to a petroleum ceresin, it is necessary to conduct the hydrogenation process of this invention in the presence of a sulfur containing catalyst possessing an activity for saturation which is sufficiently high to convert the more difficultly saturable aromatics to naphthenes. Although a high degree of saturation is attained by employing a sulfur containing catalyst comprising a group VI-B metal alone or a group VIII metal alone, a promotional effect, especially for the saturation of the more difficultly saturable aromatics to naphthenes, is achieved by employing a combination of group VI-B and group VIII metals. However, although group VIII metals exert a promotional saturation effect when used in conjunction with group VI-B metals, they also are cracking catalysts. In order to insure a substantially complete absence of cracking when employing group VIII metals in the catalyst compositions of this invention, it is necessary to employ the conditions of temperature, pressure and space velocity described below whereby substantially complete saturation of olefins and aromatics is achieved with a substantially complete absence of cracking.

We have found that employing the catalytic metals of this invention as sulfides or in a sulfided form results in improved saturation activity without an accompanying increase in cracking activity. Accordingly, the catalysts to be employed in accordance with this invention are compositions comprising at least one metal selected from the group comprising group VI-B and group VIII metals as sulfides or in the sulfided form. Examples of suitable group VI-B metals are chromium, molybdenum, tungsten and uranium. Examples of suitable group VIII metals are iron, cobalt, nickel, ruthenium, rhodium, palladium, osmium, iridium and platinum. The preferred group VI-B metals are tungsten and molybdenum, while the preferred group VIII metals are nickel and cobalt. In accordance with this invention, superior results are achieved, as explained above, by employing a mixture of at least one group VI-B metal and at least one group VIII metal as sulfides or in the sulfided form. The most preferable catalysts according to this invention are at least partially sulfided nickel and tungsten and at least partially sulfided cobalt and tungsten.

The sulfur containing catalyst compositions of this invention can be employed in either the supported or unsupported form. When employed in the supported form, non-cracking materials such as alumina, pumice, kieselguhr, clay, etc., can be employed as supports. However, cracking supports such as silica-alumina can be employed under the non-cracking process conditions described below.

The unsupported sulfur containing catalysts of this invention when first put onstream are more active for saturative hydrogenation, especially for the saturative hydrogenation of aromatics, than the supported form. However, the unsupported catalysts are only preferable where catalyst regenetration is not required or under conditions where catalyst life is unusually long. The reason for this is that the activity of the unsupported catalyst cannot be restored to more than a small fraction of its initial value of aromatic saturative hydrogenation activity by the usual catalyst regeneration procedures. On the other hand the supported catalysts of this invention can be regenerated with only a minor loss of activity resulting even after repeated regenerations. The supported catalysts can be regenerated in an air-steam mixture at temperatures near 1050° F. Resulfiding, under the sulfiding conditions described below, is generally required following regeneration of the sulfided catalysts of this invention.

The unsupported catalyst compositions of this invention are the sulfides of the active metals. The unsupported catalyst of this invention can be prepared by any suitable method. In the preferred modification a solution of ammonium sulfide and the ammonium thio salt of a group VI element is prepared by treating an ammoniacal solution of an ammonium salt of a group VI metal with hydrogen sulfide. A group VIII salt is then added to this solution to obtain a group VIII metal sulfide precipitate. Following this the group VI metal sulfide is precipitated by acidifying the medium. Thereafter the mixed sulfieds are recovered and subjected to reducing conditions and then converted into a form suitable as a catalyst.

In the preparation of the supported catalyst compositions of this invention the carrier material can be impregnated with a solution containing soluble compounds of the group VI metal or metals, such as ammonium meta tungstate, and/or soluble compounds of the group VIII metal or metals, such as nickel nitrate. The proportions of such soluble compounds placed in solution are adjusted to produce a catalyst containing the desired amount of metals and the desired ratio of metals to each other. The impregnated carrier is then dried and calcined. The metals are then sulfided. The sulfiding step in the preparation of the supported catalyst of this invention is a solid phase reaction. The impregnated carrier is treated with a gaseous or liquid sulfur containing substance by exposing the outer surface and pores of the impregnated carrier to this sulfur containing material in the presence of a reducing agent, for example, hydrogen. Examples of suitable sulfur containing materials are hydrogen sulfide, methyl sulfide, propyl sulfide, ammonium sulfide, propyl mercaptan, etc. Since the conversion of many oxides completely to the corresponding sulfides in this manner requires an excessive length of time, the sulfiding treatment for the time durations specified below does not convert the oxides completely to the sulfides. The product of the sulfiding step is a mixture of sulfides, oxides, free sulfur and free metal. Oxysulfides can also be present. In sulfiding the metals of this invention the sulfur containing materials are preferably employed in the presence of a reducing material. For example, the sulfiding operation can employe a hydrogen sulfide containing mixture such as hydrogen-hydrogen sulfide comprising 1 to 99 volume percent hydrogen sulfide (measured at 60° F. in atmospheric pressure) at a temperature of 500° F. to 700° F. for a duration of 2 to 20 hours. Preferably, the sulfiding conditions should include a hydrogen-hydrogen sulfide containing mixture having a volumetric ratio of hydrogen to hydrogen sulfide of 2 to 12, a temperature of 600° F. to 700° F., and a sulfiding time duration of 4 to 12 hours.

In the preparation of the supported catalysts of this invention which contain both group VI–B and group VIII metals, either single or multiple impregnation of the support can be employed. The preferable method of preparing such supported catalysts is by multiple impregnation in which the group VI–B metal or metals is impregnated upon the support before the impregnation of the group VIII metal or metals. We have found that impregnating the group VI–B metals upon the support before the impregnation of the group VIII metal or metals produces a catalyst having superior activity especially for the saturative hydrogenation of aromatics.

When employing a catalytic mixture of group VI–B and group VIII metals in either the supported or unsupported form, the atomic ratio of group VI–B metal to group VIII metal should be between 0.2:1 and 5:1 but the preferable ratio is between 0.8:1 and 3.0:1. When the catalyst is employed in the supported form it should contain 5 to 40 percent metals generally and preferably it should contain 10 to 25 percent metals. The sulfided supported catalysts of this invention can contain between 0.5 and 15 percent sulfur by weight.

Although the unsupported sulfide catalysts of this invention are more active when first put onstream than the supported catalysts of this invention, we have found that the activity of the supported catalysts can be considerably increased by halogen treatment. The preferable halogen to be employed is fluorine which can be employed in the free state or as a compound as, for example, a hydrogen fluoride or metal fluoride. The amount of halogen upon the catalyst should be between 0.4 and 6 percent generally and preferably the halogen content of the catalyst should be between 0.6 and 2 percent. Although halogen promotion increases hydrogenation activity, especially for the saturation of aromatics, it also enhances the cracking activity of the catalyst in which it was employed. In order to take advantage of the improved hydrogenation activity that halogen promotion offers without being subjected to increased cracking activity, it is necessary to keep the temperature below the 725° F. temperature specified below. As long as reaction temperatures are maintained below 725° F. essentially no cracking will occur when employing a halogen promoted catalyst although increased hydrogenation activity will be achieved and therefore the reaction product will comprise primarily a ceresin having a reduced degree of unsaturation as compared to the charge, this being accomplished without substantial cracking. Since halogen promotion generally results in lower temperature requirements to achieve a given degree of saturation, it is noted that when a halogen promoted catalyst is employed it will generally not be necessary to operate near 725° F. but rather in a lower portion of the temperature range of this invention.

Halogen promotion can be effected by halogen treating the carrier before the impregnation of the metals. The finished catalyst can also be halogen treated. In addition, the halogen treatment can be effected simultaneously with the impregnation of the active metals upon the carrier, thereby omitting a drying step from the catalyst preparation process.

Since the unsupported catalysts of this invention are not as resistant to deactivation with age as the same catalysts disposed upon a supporting material, if an unsupported sulfide catalyst is employed, a guard chamber of a supported catalyst such as, for example, cobalt-molybdenum sulfide on alumina or a spent unsupported sulfide catalyst can be used to act as a protector for the more easily deactivated unsupported catalysts. By passing the charge stock through the guard chamber in the presence of hydrogen prior to saturative hydrogenation of the charge in the presence of an unsupported sulfided catalyst of this invention, the carbon residue, sulfur and oxygen contents of the charge, which tend to deactivate the unsupported catalyst are reduced while avoiding any substantial cracking of the charge. The reaction conditions in the guard chamber include a temperature of from 400° F. to 550° F., and a space velocity of 0.1 to 0.75 liquid volume of charge per volume of catalyst per hour. However, higher temperatures, i.e., 550° F. to 650° F. can be employed in the guard chamber by employing higher space velocities, i.e. 1 to 5 liquid volumes of charge per volume of catalyst per hour. Guard chamber pressures can range from 1,500 to 10,000 pounds per square inch gauge and guard chamber hydrogen circulation rates can vary between 1,000 to 10,000 standard cubic feet per barrel.

The reaction conditions for the hydrogenation process in the main hydrogenation chamber are such that saturation reactions are furthered while hydrocracking is held to negligible amounts. In order to achieve maximum hydrogenation with a substantial absence of cracking, the hydrogenation temperature is maintained between about 525° F. and 725° F. and preferably between 550° and 700° F. Temperatures in the lower portion of this range are generally employed when a fresh catalyst is put on-stream and, as the activity of the catalyst diminishes with age, temperatures in the higher portion of this range can be employed. In order to avoid cracking, temperatures should never range above 725° F. generally and preferably never above 700° F. especially when a fresh or only mildly deactivated catalyst is employed or at low space velocities and regardless of whether there is a small amount or a large amount of unsaturates present. Space velocities from 0.25 to 3.5 liquid volumes of charge per hour per volume of catalyst can be employed. Hydrogen circulation rates can range between 500 and 20,000 standard cubic feet per barrel generally and 1,000 to 10,000 standard cubic feet per barrel preferably.

The pressure to be employed is critical to the results achieved according to the method of this invention. As noted above, when employing a catalyst comprising a group VIII metal it is especially important to maintain relatively low temperatures since group VIII metals exert a cracking effect at higher temperatures. However, low temperatures result in relatively low saturative conversions. In order to increase saturative conversions without employing temperatures in the cracking range, it is necessary to maintain relatively high reaction pressures. Accordingly, reaction pressures of at least 1,500 pounds per square inch gauge and most preferably at least 3,000 pounds per square inch gauge should be employed. Pressures up to 10,000 pounds per square inch gauge or more can be employed, but when employing the catalysts and conditions of this invention, sufficiently high saturative conversions are achived at the lower pressures to effectively eliminate color. At a pressure of about 1,500 pounds per square inch gauge, essentially all olefins and diolefins are saturated and approximately 60 percent of the aromatics present are saturated with negligible concomitant cracking even when cracking type catalytic metals or carrier materials are employed as long as the process temperature remains below 725° F. as specified above. At a pressure of 3,000 pounds per square inch gauge, approximately 85 to approximately 100 percent of the aromatics are saturated, in addition to substantially all the olefins and diolefins. These pressures are sufficient to effectively remove all traces of color.

The materials which are treated in accordance with this invention include petroleum ceresins such as natural petrolatums and artificial petrolatums. Petroleum ceresins, such as natural and artificial petrolatums, are mixtures of heavy oils and micro-crystalline wax. A similar high molecular weight material can be employed in place of microcrystalline wax. The consistency of a petroleum ceresin depends on the viscosity which, in turn, depends on the oil content. If a petroleum ceresin is overly stiff, that is, it contains too high a proportions of wax, a heavy mineral oil can be added to reduce the viscosity and make the material more salve-like. On the other hand, if it is desired to increase the consistency, oil can be removed. In general, petroleum ceresins comprise 50 to 95 weight percent microcrystalline wax together with 50 to 5 percent heavy oils. Natural petrolatums are mixtures of heavy oils and wax which are recovered directly from refinery processing operations while artificial petrolatum is a specially prepared mixture of heavy oil and wax.

The following examples illustrate the processes of this invention. In each of the following examples the conditions of hydrotreating were the same, i.e., a reaction temperature of 700° F., a reactor outlet pressure of 3000 pounds per square inch gauge, a space velocity of 0.50 liquid volume of charge per volume of catalyst, and a hydrogen circulation rate of 2000 standard cubic feet of hydrogen per barrel of charge. The catalyst employed in these examples was unsupported nickel-tungsten sulfide containing nickel and tungsten in an atomic ratio of 15:1.

The unsupported nickel-tungsten sulfide catalyst employed in these examples was prepared by combining a tungstic acid solution with a solution of ammonium hydroxide and hydrogen sulfide to produce ammonium thiotungstate. A solution of nickel nitrate was then added followed by the precipitation of nickel sulfide. Sulfuric acid was then added to the solution which decomposed the ammonium thiotungstate and precipitated tungsten trisulfide. The resulting slurry was then filtered and the mixture of sulfides was dried in a stream of nitrogen and roasted in a mixture of hydrogen and hydrogen sulfide having a volumetric ratio of hydrogen to hydrogen sulfide of 4, at a temperature of 650° F. for 6 hours.

In the following example a high oil content microcrystalline wax was hydrogenated under the conditions indicated. Following are the results of this hydrogenation.

Operating conditions:
Temperature, ° F._____ 700
Pressure, pounds per square inch gauge_____ 3,000
Space velocity, volumes of liquid charge per hour per volume of catalyst_____ 0.5
Hydrogen to oil ratio, standard cubic feet per barrel_ 2,000

| Inspections | Charge | Product |
|---|---|---|
| Melting Point, D-127, ° F. | 127.7 | 118.5 |
| Penetration, D-5, 77° F., 100 G., 5 Sec. | 155 | >380 |
| Oil Content, D-721, Percent by Weight | 30.9 | 31.1 |
| Color | Brownish Hue | Water White |

As indicated, the color of the wax treated was changed from a brownish hue to water white.

In another example a natural petrolatum was hydrogenated under the conditions indicated. Following are the results of this example.

Operating conditions:
Temperature, ° F._____ 700
Pressure, pounds per square inch gauge_____ 3,000
Space velocity, volumes of liquid charge per hour per volume of catalyst_____ 0.5
Hydrogen to oil ratio, standard cubic feet per barrel_ 2,000

| Inspections | Charge | Product |
|---|---|---|
| Melting Point, D-127, ° F. | 116.0 | 119.7 |
| Penetration, D-5, 77° F., 100 G., 5 Sec. | >380 | >380 |
| Oil Content, D-721, Percent by Weight | 33.3 | 30.4 |
| Color | Brownish Hue | Water White |

As shown, the color changed from a brownish hue to water white.

Various changes and modifications can be made without departing from the spirit of this invention and the scope thereof as defined in the following claims.

We claim:

1. A process for the substantially complete removal of color from a petroleum ceresin comprising passing the petroleum ceresin in the presence of hydrogen over a sulfided supported catalyst comprising a mixture of at least one metal selected from group VI-B and at least one metal selected from group VIII, the atomic ratio of group VIII and group VI-B metals being between 0.2:1 and 5:1, said catalyst containing between 0.4 and 6 percent by weight of halogen and said catalyst containing between 0.2 and 15 percent by weight of sulfur, at a hydrogenation temperature of 525° F. to 725° F., a space velocity of 0.25 to 3.5 liquid volumes of charge per hour per volume of catalyst and a pressure above 1500 pounds per square inch gauge and recovering a product comprising primarily ceresin having a reduced degree of unsaturation as compared to the charge, said process resulting in substantially no cracking.

2. A process for the substantially complete removal of color from a petroleum ceresin comprising passing the petroleum ceresin in the presence of hydrogen over a sulfided supported catalyst comprising a mixture of at least one metal selected from group VI-B and at least one metal selected from group VIII, the atomic ratio of group VIII and group VI-B metals being between 0.2:1 and 5:1, said catalyst containing between 0.4 and 6 percent by weight of fluorine and said catalyst containing between 0.2 and 15 percent by weight of sulfur, at a hydrogenation temperature of 525° F. to 725° F., a space velocity of 0.25 to 3.5 liquid volumes of charge per hour per volume of catalyst and a pressure above 1500 pounds per square inch gauge and recovering a product comprising primarily ceresin having a reduced degree of unsaturation as compared to the charge, said process resulting in substantially no cracking.

3. A process for the substantially complete removal of color from a petroleum ceresin comprising passing the petroleum ceresin in the presence of hydrogen over a sulfided supported catalyst comprising a mixture of at least one metal selected from group VI-B and at least one metal selected from group VIII, the atomic ratio of group VIII and group VI-B metals being between 0.2:1 and 5:1, said catalyst containing between 0.6 and 2 percent by weight of halogen and said catalyst containing between 0.2 and 15 percent by weight of sulfur, at a hydrogenation temperature of 525° F. to 725° F., a space velocity of 0.25 to 3.5 liquid volumes of charge per hour per volume of catalyst and a pressure above 1500 pounds per square inch gauge and recovering a product comprising primarily ceresin having a reduced degree of unsaturation as compared to the charge, said process resulting in substantially no cracking.

4. A process for the substantially complete removal of color from a petroleum ceresin comprising passing the petroleum ceresin in the presence of hydrogen over a sulfided supported catalyst comprising a mixture of at least one metal selected from group VI-B and at least one metal selected from group VIII, the atomic ratio of group VIII and group VI-B metals being between 0.2:1 and 5:1, said catalyst containing between 0.6 and 2 percent by weight of fluorine and said catalyst containing between 0.2 and 15 percent by weight of sulfur, at a hydrogenation temperature of 525° F. to 725° F., a space velocity of 0.25 to 3.5 liquid volumes of charge per hour per volume of catalyst and a pressure above 1500 pounds per square inch gauge and recovering a product comprising primarily ceresin having a reduced degree of unsaturation as compared to the charge, said process resulting in substantially no cracking.

References Cited in the file of this patent

UNITED STATES PATENTS

| | | |
|---|---|---|
| 1,930,468 | Mueller-Cunradi et al. | Oct. 17, 1933 |
| 1,973,833 | Wietzel | Sept. 18, 1934 |
| 2,800,429 | Porter et al. | July 23, 1957 |
| 2,846,356 | Mills et al. | Aug. 5, 1958 |

FOREIGN PATENTS

| | | |
|---|---|---|
| 800,965 | France | May 11, 1936 |
| 1,097,444 | France | Feb. 16, 1955 |

UNITED STATES PATENT OFFICE
CERTIFICATE OF CORRECTION

Patent No. 2,998,377                               August 29, 1961

Harold Beuther et al.

It is hereby certified that error appears in the above numbered patent requiring correction and that the said Letters Patent should read as corrected below.

Column 3, line 18, for "sulfieds" read -- sulfides --; column 6, line 2, for "15:1" read -- 1.5:1 --.

Signed and sealed this 3rd day of April 1962.

(SEAL)
Attest:

ERNEST W. SWIDER
Attesting Officer

DAVID L. LADD
Commissioner of Patents